United States Patent
Ono et al.

(10) Patent No.: US 8,429,901 B2
(45) Date of Patent: Apr. 30, 2013

(54) EXHAUST GAS PURIFICATION DEVICE

(75) Inventors: Taisuke Ono, Osaka (JP); Toshihisa Kanda, Osaka (JP)

(73) Assignee: Yanmar Co., Ltd., Osaka-shi (JP)

( * ) Notice: Subject to any disclaimer, the term of this patent is extended or adjusted under 35 U.S.C. 154(b) by 367 days.

(21) Appl. No.: 12/919,112

(22) PCT Filed: Feb. 23, 2009

(86) PCT No.: PCT/JP2009/053196
§ 371 (c)(1),
(2), (4) Date: Nov. 23, 2010

(87) PCT Pub. No.: WO2009/107583
PCT Pub. Date: Sep. 3, 2009

(65) Prior Publication Data
US 2011/0056191 A1    Mar. 10, 2011

(30) Foreign Application Priority Data
Feb. 25, 2008    (JP) .................................. 2008-043153

(51) Int. Cl.
*F01N 3/00*    (2006.01)

(52) U.S. Cl.
USPC ................... 60/286; 60/288; 60/292; 60/295; 60/301; 60/303

(58) Field of Classification Search .................... 60/286, 60/287, 288, 289, 292, 293, 295, 297, 301, 60/303, 324
See application file for complete search history.

(56) References Cited

U.S. PATENT DOCUMENTS

| | | | | |
|---|---|---|---|---|
| 5,406,790 A * | 4/1995 | Hirota et al. | ..................... | 60/276 |
| 6,170,259 B1 * | 1/2001 | Boegner et al. | ................. | 60/286 |
| 6,834,496 B2 * | 12/2004 | Nakatani et al. | ................ | 60/274 |
| 7,571,602 B2 * | 8/2009 | Koch | .............................. | 60/286 |
| 8,079,213 B2 * | 12/2011 | Tsujimoto et al. | ............. | 60/295 |
| 2008/0141663 A1 | 6/2008 | Ono | | |
| 2009/0013674 A1 | 1/2009 | Ono | | |

FOREIGN PATENT DOCUMENTS

| | | | |
|---|---|---|---|
| JP | 2005-207281 A | 8/2005 | |
| JP | 2006-112313 A | 4/2006 | |
| JP | 2006-272115 A | 10/2006 | |

(Continued)

OTHER PUBLICATIONS

International Search Report dated May 19, 2009 including English-language translation (Six (6) pages).

(Continued)

*Primary Examiner* — Binh Q Tran
(74) *Attorney, Agent, or Firm* — Crowell & Moring LLP

(57) ABSTRACT

An exhaust gas purification device 1 is equipped with a plurality of branch exhaust passages 2 and 3; a junction exhaust passage 110; a shutoff valve 4 switching between allowing and shutting off the flow of exhaust gas to the respective branch exhaust passages 2 and 3; a nitrogen oxide adsorbing material 5 temporarily adsorbing nitrogen oxides in an excess air atmosphere and detaching the adsorbed nitrogen oxides in a reducing atmosphere and reducing the nitrogen oxides in the reducing atmosphere to produce ammonia; a first combustion device 6, disposed on the exhaust upstream side of the nitrogen oxide adsorbing material 5 and having an air supply unit, changing the air supplied from the air supply unit into the reducing atmosphere; and a selective reduction catalyst 19, provided inside the junction exhaust passage 110, selectively reducing the nitrogen oxides by using ammonia as a reducing agent.

8 Claims, 7 Drawing Sheets

FOREIGN PATENT DOCUMENTS

| | | |
|---|---|---|
| JP | 2006-274875 A | 10/2006 |
| JP | 2006-274986 A | 10/2006 |
| JP | 2007-127069 A | 5/2007 |
| WO | WO 2006/008625 A1 | 1/2006 |
| WO | WO 2006/103915 A1 | 10/2006 |

OTHER PUBLICATIONS

Japanese-language Office Action dated Aug. 14, 2012 (three (3) pages).

* cited by examiner

EXHAUST GAS PURIFICATION DEVICE

TECHNICAL FIELD

The present invention relates to a device purifying exhaust gas discharged from internal combustion engines, such as diesel engines, gas engines, gasoline engines or gas turbine engines, or burning appliances, such as combustion furnaces and boilers, and more particularly, relate to an exhaust gas purification device, connected to the exhaust passage of an internal combustion engine or the like performing normal operation in an excess air state, and eliminating nitrogen oxides.

BACKGROUND ART

Harmful components, such as nitrogen oxides, carbon monoxide and hydrocarbons, are contained in exhaust gas discharged from internal combustion engines, etc. Various kinds of devices have been developed conventionally to eliminate such substances from the exhaust gas thereby to purify the exhaust gas.

The applicant of the present invention developed an exhaust gas purification device and has already applied for a patent (Patent document 1). FIG. 7 shows an exhaust gas purification device shown in FIG. 1 of Patent document 1. As shown in FIG. 7, in the conventional exhaust gas purification device proposed by the applicant, a nitrogen oxide adsorbing material 204, a first combustion device (adsorbed material detachment unit) 203 and a second combustion device 205 are provided for each of a plurality of branch exhaust passages 202a and 202b connected to an internal combustion engine or the like. The exhaust gas discharged from the internal combustion engine or the like. is supplied only to one of the branch exhaust passages, i.e., 202a (or 202b), and not supplied to the other branch exhaust passage 202b (or 202a). Furthermore, in the branch exhaust passage 202a to which the exhaust gas is supplied, nitrogen oxides are adsorbed onto the nitrogen oxide adsorbing material 204 and eliminated, and carbon monoxide and hydrocarbons are oxidized to carbon dioxide and water by the oxidation catalyst contained in the nitrogen oxide adsorbing material 204. On the other hand, in the branch exhaust passage 202b to which the supply of the exhaust gas is shut off, nitrogen oxides are detached from the nitrogen oxide adsorbing material 204 by the first combustion device 203, and the detached nitrogen oxides are reduced to nitrogen by the second combustion device 205. In other words, normal operation in which nitrogen oxides are adsorbed onto the nitrogen oxide adsorbing material 204 is performed in the one branch exhaust passage 202a. At the same time, in the other branch exhaust passage 202b, regeneration operation in which nitrogen oxides are detached from the adsorbed material detachment unit 204 is performed. As a result, the adsorption capability of the nitrogen oxide adsorbing material 204 is maintained.

The exhaust gas purification device shown in FIG. 7 is a purification device that does not use a three-way catalyst, ammonia, urea, etc. The three-way catalyst serving as a catalyst capable of decomposing nitrogen oxides, carbon monoxide and hydrocarbons simultaneously does not act effectively in an excess air condition. In the case of a purification device that uses ammonia, etc., the device itself is very complicated and expensive. In addition, maintenance cost is necessary for ammonia, etc. serving reducing agents, and it is necessary to provide a system for supplying ammonia, etc., whereby many problems occur. In the exhaust gas purification device shown in FIG. 7, these problems have been solved. The exhaust gas purification device shown in FIG. 7 can eliminate harmful components (nitrogen oxides, carbon monoxide and hydrocarbons) from the exhaust gas discharged from an internal combustion engine or the like operating in an excess air condition to purify the exhaust gas and can maintain its purification capability without lowering the capability.

Patent document 1: Japanese Patent Application Laid-open Publication No. 2006-272115

SUMMARY OF INVENTION

Technical Problem

In the case of purifying exhaust gas by adsorbing the nitrogen oxides contained in the exhaust gas onto a nitrogen oxide adsorbing material as in the exhaust gas purification device shown in FIG. 7, the following problem will occur. When the adsorption performance of the nitrogen oxide adsorbing material is lowered with the increase in the amount of the adsorbed nitrogen oxides, the amount of the nitrogen oxides not eliminated from the exhaust gas increases. In other words, the amount of the nitrogen oxides discharged into the atmosphere increases. In particular, in the case that the temperature of the exhaust gas is low, the adsorption performance of the nitrogen oxide adsorbing material is lowered further, and the amount of the nitrogen oxides discharged into the atmosphere increases further. If the frequency of the regeneration operation is increased, the adsorption performance of the nitrogen oxide adsorbing material can be prevented from being lowered. However, in this case, another problem will occur in which the amount of the energy (the amounts of the fuel required for the combustion devices 205 and 203) required for the regeneration operation increases.

The present invention is intended to provide an exhaust gas purification device configured to eliminate the nitrogen oxides contained in exhaust gas by adsorbing the nitrogen oxides onto a nitrogen oxide adsorbing material so as to be able to prevent the amount of the nitrogen oxides discharged into the atmosphere from increasing even if the adsorption performance of the nitrogen oxide adsorbing material is lowered.

Solution to Problem

An aspect of the present invention is to provide an exhaust gas purification device connected to an exhaust passage on the engine side of an internal combustion engine or a burning appliance, the exhaust gas purification device comprising: a plurality of branch exhaust passages connected to the exhaust passage on the engine side; a junction exhaust passage formed by the union of the respective branch exhaust passages on the exhaust downstream side of the respective branch exhaust passages; an exhaust gas shutoff unit switching between allowing and shutting off the flow of exhaust gas into the respective branch exhaust passages from the exhaust passage on the engine side by opening or closing the exhaust inlets of the respective branch exhaust passages; a nitrogen oxide adsorbing material, disposed inside each of the respective branch exhaust passages, temporarily adsorbing nitrogen oxides in an excess air atmosphere, and detaching the adsorbed nitrogen oxides in a reducing atmosphere; a reducing atmosphere generator, disposed on the exhaust upstream side of the nitrogen oxide adsorbing material inside each of the branch exhaust passages, having an air supply unit, and changing the air supplied from the air supply unit into the reducing atmosphere; and a selective reduction catalyst, provided inside the junction exhaust passage, and selectively reducing the nitrogen oxides by using ammonia as a reducing agent.

It is preferable that the aspect of the present invention adopts the following configurations (a) to (g).

(a) The aspect of the present invention is to provide the exhaust gas purification device wherein the reducing atmosphere generator is a first combustion device comprising an air supply unit, a fuel supply unit and an ignition unit.

(b) The aspect of the present invention is to provide the exhaust gas purification device wherein the nitrogen oxide adsorbing material contains at least one of Pt, Pd and Rh as a component thereof.

(c) The aspect of the present invention is to provide the exhaust gas purification device further comprising: an oxidation catalyst disposed on the exhaust downstream side of the selective reduction catalyst inside the junction exhaust passage.

(d) The aspect of the present invention is to provide the exhaust gas purification device further comprising: a second combustion device on the exhaust downstream side of the selective reduction catalyst inside the junction exhaust passage, wherein the second combustion device comprises an air supply unit, a fuel supply unit and an ignition unit.

(e) The aspect of the present invention is to provide the exhaust gas purification device further comprising: a filter member, disposed on the exhaust downstream side of the second combustion device inside the junction exhaust passage, and being capable of trapping particulate matter contained in the exhaust gas.

(f) The aspect of the present invention is to provide the exhaust gas purification device wherein the adsorption performance of the nitrogen oxide adsorbing material is adjusted so that the adsorption performance in a high temperature range becomes higher than the adsorption performance in the other temperature range, where the high temperature range and the other temperature range are included within all temperature range of the exhaust gas and the high temperature range is composed of temperatures which are higher than or equal to a predetermined temperature, wherein the purification performance of the selective reduction catalyst is adjusted so that the purification performance in low temperature range becomes higher than the purification performance in the other temperature range, where the low temperature range and the other temperature range are included within the all temperature range of the exhaust gas and the low temperature range is composed of temperatures which are lower than or equal to the predetermined temperature.

(g) The aspect of the present invention is to provide the exhaust gas purification device further comprising: a controller controlling the exhaust gas shutoff unit and the reducing atmosphere generators so that the implementation period of regeneration operation for operating one of the reducing atmosphere generators is synchronized with the final stage of the implementation period of normal operation in the other branch exhaust passages.

Advantageous Effects of Invention

According to the aspect of the present invention, the nitrogen oxides not adsorbed onto the nitrogen oxide adsorbing material can be rendered harmless, and the amount of the nitrogen oxides discharged into the atmosphere can be prevented from increasing.

Furthermore, according to the configuration (a), the reducing atmosphere generator can provide a rising temperature atmosphere in addition to the reducing atmosphere. Furthermore, reducing atmospheres and rising temperature atmospheres in various conditions can be generated by adjusting the flow rate of the air and the flow rate of the fuel. In particular, the reducing atmosphere generator can provide reducing agents, such as carbon monoxide and hydrocarbons, by virtue of a partial oxidation reaction in an excess fuel condition, whereby the nitrogen oxides are detached and reduced effectively.

Furthermore, according to the configuration (b), the nitrogen oxides are reduced to ammonia effectively by the catalytic action of the nitrogen oxide adsorbing material.

Furthermore, according to the configuration (c), the ammonia and unburned matters can be prevented from being discharged into the atmosphere. As a result, even if the reducing atmosphere is generated excessively, no problem occurs, whereby the regeneration (the detachment of the nitrogen oxides) of the nitrogen oxide adsorbing material can be carried out effectively.

Furthermore, according to the configuration (d), the ammonia and unburned matters (carbon monoxide and hydrocarbons) can be prevented from being discharged into the atmosphere. As a result, even if the reducing atmosphere is generated excessively, no problem occurs, whereby the regeneration (the detachment of the nitrogen oxides) of the nitrogen oxide adsorbing material can be carried out effectively. Furthermore, in comparison with the oxidation catalyst, the second combustion device is advantageous in that performance degradation due to continuous use and performance reduction due to temperature dependency do not occur.

Furthermore, according to the configuration (e), the particulate matter can be eliminated from the exhaust gas. Furthermore, the trapping capability of the filter member can be maintained by the operation of the second combustion device.

Furthermore, according to the configuration (f), the nitrogen oxides are discharged in a harmless state from the exhaust gas purification device regardless of whether the temperature of the exhaust gas is in the high temperature range or in the low temperature range.

Furthermore, according to the configuration (g), when the amount of the nitrogen oxides passing through the nitrogen oxide adsorbing material without being adsorbed is the largest, ammonia is supplied to the selective reduction catalyst, whereby the amount of the nitrogen oxides discharged into the atmosphere is decreased further.

Figure 1:
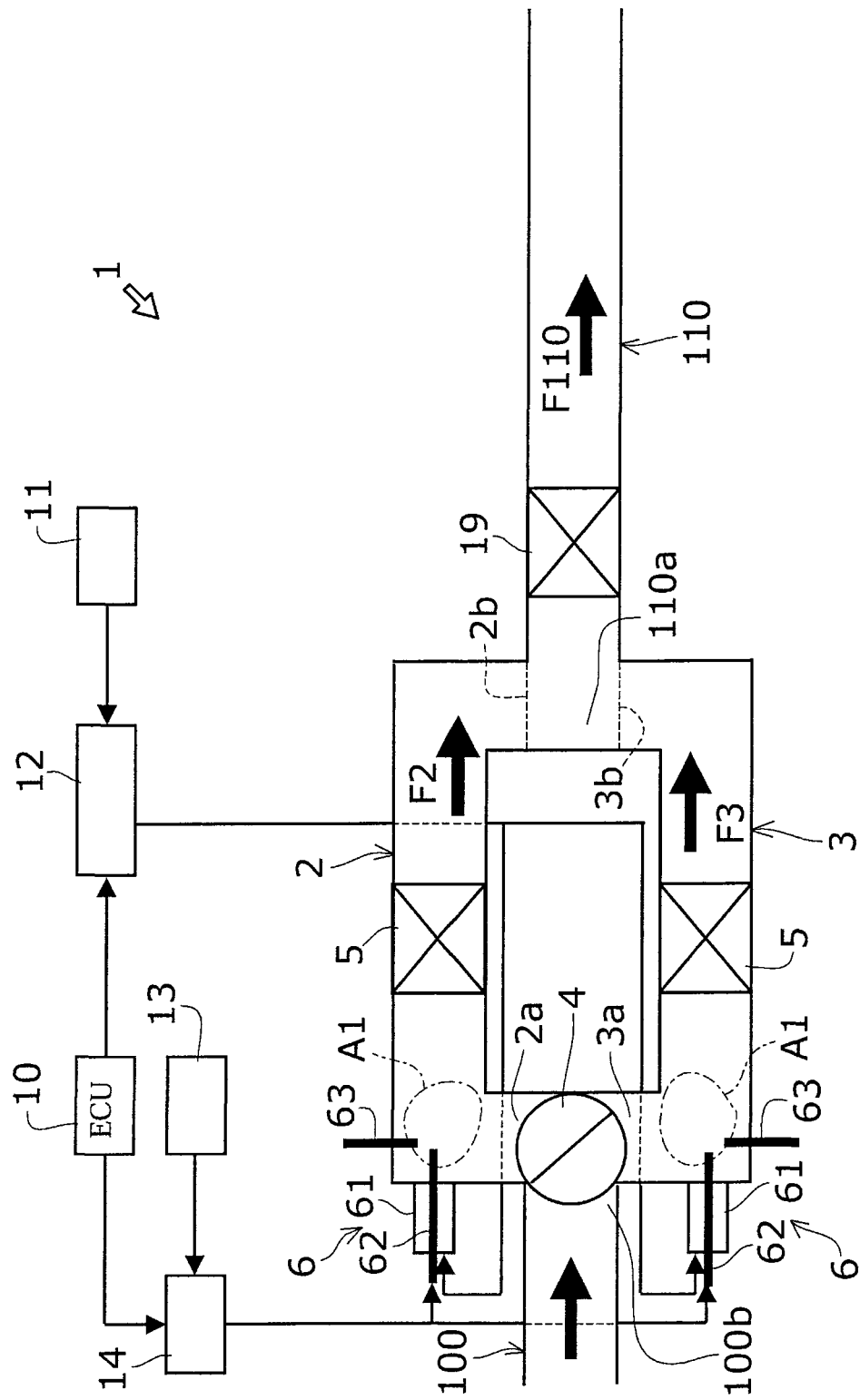
FIG. 1 is a schematic view showing an exhaust gas purification device (a first embodiment)

REFERENCE SIGNS LIST 1 exhaust gas purification device
2, 3 branch exhaust passage
2a, 3a exhaust inlet
2b, 3b exhaust outlet
4 shutoff valve
5 nitrogen oxide adsorbing material
6 first combustion device (reducing atmosphere generator)
7 second combustion device
8 filter member
10 controller
19 selective reduction catalyst
20 oxidation catalyst
61, 71 air nozzle (a part of air supply unit)
62, 72 fuel nozzle (a part of fuel supply unit)
63, 73 ignition plug (ignition unit)
100 exhaust passage on the engine side
110 junction exhaust passage

DESCRIPTION OF EMBODIMENTS

Configuration of First Embodiment

An exhaust gas purification device 1 according to a first embodiment will be described below referring to FIG. 1. The exhaust gas purification device 1 is a device connected to an exhaust passage 100 on the engine side of an internal combustion engine or a burning appliance.

The internal combustion engine or the burning appliance burns a mixture gas of air and fuel and produces exhaust gas. The exhaust gas contains nitrogen oxides (NOx); carbon monoxide (CO) and hydrocarbons (HC) as unburned matters; etc. The exhaust gas generated in the internal combustion engine or the burning appliance is discharged from the exhaust passage 100 on the engine side.

FIG. 1 shows the exhaust passage 100 on the engine side, a plurality (two in this embodiment) of branch exhaust passages 2 and 3, and a junction exhaust passage 110, these serving as exhaust gas passages. The branch exhaust passages 2 and 3 and the junction exhaust passage 110 are exhaust passages provided for the exhaust gas purification device 1. The exhaust outlet 100b of the exhaust passage 100 on the engine side is connected to the exhaust inlets 2a and 3a of the branch exhaust passages 2 and 3. The exhaust outlets 2b and 3b of the branch exhaust passages 2 and 3 are connected to the exhaust inlet 110a of the junction exhaust passage 110. These exhaust passages 100, 2, 3 and 110 are passages shut off from the outside air and formed of pipes, for example.

The exhaust gas from the exhaust passage 100 on the engine side flows into the junction exhaust passage 110 through the branch exhaust passage 2 or the branch exhaust passage 3 and then discharged into the atmosphere. In the following description, the directions of the exhaust gas flowing in the branch exhaust passages 2 and 3 and the junction exhaust passage 110 are defined as exhaust directions F2, F3 and F110, respectively.

The exhaust gas purification device 1 is equipped with a controller (electronic control unit) 10. The controller 10 controls various devices (described later) provided for the exhaust gas purification device 1.

The exhaust gas purification device 1 is equipped with an exhaust gas shutoff unit, and the exhaust gas shutoff unit switches between allowing and shutting off the flow of exhaust gas into the respective branch exhaust passages 2 and 3 from the exhaust passage 100 on the engine side by closing the exhaust inlets 2a and 3a of the branch exhaust passages 2 and 3.

More specifically, the junction portion of the exhaust passage 100 on the engine side and the branch exhaust passages 2 and 3 is provided with a gas shutoff valve 4 as the exhaust gas shutoff unit. The gas shutoff valve 4 allows the flow of the exhaust gas from the exhaust outlet 100b of the exhaust passage 100 on the engine side to the exhaust inlets 2a and 3a of the branch exhaust passages 2 and 3 or shuts off the flow. The switching between allowing and shutting off the flow using the shutoff valve 4 is controlled by the controller 10. The exhaust gas shutoff unit may be a group of changeover valves each provided for each of the respective branch exhaust passages 2 and 3. In this case, each of the changeover valves is provided at each of the exhaust inlet 2a of the branch exhaust passage 2 and the exhaust inlet 3a of the branch exhaust passage 3.

The exhaust gas purification device 1 is equipped with a nitrogen oxide adsorbing material 5 and a reducing atmosphere generator (first combustion device 6) inside each of the branch exhaust passages 2 and 3 inside each of the branch exhaust passages 2 and 3. The first combustion device 6 and the nitrogen oxide adsorbing material 5 are arranged in this order in each of the exhaust directions F2 and F3. In addition, the exhaust gas purification device 1 is equipped with a selective reduction catalyst 19 inside the junction exhaust passage 110.

The nitrogen oxide adsorbing material 5 performs the following action because of the components contained therein. The nitrogen oxide adsorbing material 5 temporarily adsorbs the nitrogen oxides in an excess air atmosphere and detaches the adsorbed nitrogen oxides in a reducing atmosphere. The nitrogen oxide adsorbing material 5 reduces the nitrogen oxides in the reducing atmosphere and generates ammonia.

An excess air state is herein defined as a state in which the excess air ratio (the value obtained by dividing the air-fuel ratio of the supplied mixture gas by an ideal air-fuel ratio) in the mixture gas of air (oxygen) and fuel is larger than one. In addition, a state in which the excess air ratio is smaller than one is an excess fuel state. A reducing atmosphere is defined as a gas being in a state in which the amount of a reducing agent is excessive and the amount of oxygen is insufficient when combustion (oxidation-reduction reaction) occurs.

Noble metals, such as Pt, Pd and Pd, can be used as the components of the nitrogen oxide adsorbing material 5. These metals act as catalyst components having an oxidation action and also have an action reducing the nitrogen oxides.

In the reducing atmosphere, the nitrogen oxide adsorbing material 5 containing noble metals, such as Pt, Pd and Pd, reduces the nitrogen oxides to ammonia produced as an intermediate product or to nitrogen (nitrogen molecule) produced as a final product. These products are different depending on temperature conditions. A relatively large amount of nitrogen is produced in a high temperature atmosphere of not less than a predetermined temperature Tp, and a relatively large amount of ammonia is produced in a low temperature atmosphere of less than the predetermined temperature Tp.

The reducing atmosphere generator is a detachment unit which has an air supply unit and changes the air supplied from the air supply unit into a reducing atmosphere.

In this embodiment, the reducing atmosphere generator is a combustion device (the first combustion device 6). The first combustion device 6 includes an air supply unit, a fuel supply unit and an ignition unit. Furthermore, the first combustion device 6 causes a combustion reaction in an excess fuel condition and generates unburned matters (carbon monoxide and hydrocarbons) serves as reducing agents.

The air supply unit of the first combustion device 6 is equipped with an air supply unit 11, an air amount adjustment unit 12 and an air nozzle 61. The air supply unit 11 takes in outside air and supplies the air to the air amount adjustment unit 12. The air amount adjustment unit 12 adjusts the amount of the supplied air (outside air) and supplies the air to the air nozzle 61. The air nozzle 61 is a nozzle being open in a first combustion zone A1 inside each of the branch exhaust passages 2 and 3. The air supplied to the air nozzle 61 is injected into each of the branch exhaust passages 2 and 3. The controller 10 controls the air amount adjustment unit 12, thereby adjusting the amount of the air supplied to the air nozzle 61.

The fuel supply unit of the first combustion device 6 is equipped with the controller 10, a fuel tank 13, a fuel amount adjustment unit 14 and a fuel nozzle 62. Fuel is stored in the fuel tank 13. The fuel amount adjustment unit 14 adjusts the amount of the fuel supplied from the fuel tank 13 and supplies the fuel to the fuel nozzle 62. The fuel nozzle 62 is a nozzle being open in the first combustion zone A1 inside each of the branch exhaust passages 2 and 3. The first combustion zone A1 is positioned on the exhaust upstream side of the nitrogen oxide adsorbing material 5. The fuel supplied to the fuel nozzle 62 is injected into each of the branch exhaust passages 2 and 3. Furthermore, the controller 10 controls the fuel amount adjustment unit 14, thereby adjusting the amount of the fuel supplied to the fuel nozzle 62.

The ignition unit of the first combustion device 6 is an ignition plug 63. The ignition plug 63 is a device which performs ignition inside each of the branch exhaust passages 2 and 3. The air injected from the air nozzle 61 is mixed with the fuel injected from the fuel nozzle 62 to form a mixture gas in the first combustion zone A1 inside each of the branch exhaust passages 2 and 3. The ignition plug 63 ignites this mixture gas to cause combustion.

The range of the first combustion zone A1 is determined as described below. The first combustion zone A1 is defined as a zone inside each of the branch exhaust passages 2 and 3 in which the combustion reaction by means of the first combustion device 6 occurs. The first combustion zone A1 ranges from the air nozzle 61 to a position ahead (on the exhaust upstream side) of the nitrogen oxide adsorbing material 5 in each of the exhaust directions F2 and F3. The range of the first combustion zone A1 is determined depending on the speed of the air injected from the air nozzle 61, the excess air ratio of the mixture gas, etc.

The first combustion device 6 burns a first mixture gas (the mixture gas of fuel and air) being in an excess fuel state in the first combustion zone A1, thereby generating a reducing atmosphere on the exhaust downstream side of the first combustion device 6. A first burned gas generated when the first mixture gas being in the excess fuel state is burned contains unburned matters (carbon monoxide and hydrocarbons). For this reason, a reducing atmosphere is generated. Furthermore, the first burned gas is warmed by the heat of the combustion reaction. For this reason, a rising temperature atmosphere can also be generated in addition to the reducing atmosphere on the exhaust downstream side of the first combustion device 6 by adjusting the distance between the first combustion device 6 and the nitrogen oxide adsorbing material 5 and by adjusting the amount of the fuel in the first burned gas. The nitrogen oxides are detached from the nitrogen oxide adsorbing material 5 more effectively by generating the reducing atmosphere in addition to the rising temperature atmosphere.

Exactly speaking, the position of the first combustion device 6 in each of the branch exhaust passages 2 and 3 indicates the positions of the air nozzle 61, the fuel nozzle 62 and the ignition plug 63. The air nozzle 61, the fuel nozzle 62 and the ignition plug 63 of the first combustion device 6 are components directly relating to each of the branch exhaust passages 2 and 3.

However, the reducing atmosphere generator is not limited to the first combustion device 6 described above. The reducing atmosphere generator should only be equipped with the air supply unit and be able to provide the reducing atmosphere. The air supply unit is required to blow air inside the branch exhaust passage 2 when the exhaust inlet 2a is closed.

The selective reduction catalyst 19 is provided inside the junction exhaust passage 110 and is a material containing a catalyst which selectively reduces nitrogen oxides by using ammonia as a reducing agent. When gas containing ammonia and nitrogen oxides is supplied to the selective reduction catalyst 19, the ammonia chemically reacts with the nitrogen oxides and generates nitrogen (nitrogen molecule) and water.

(Operation of First Embodiment)

Next, the operation of the exhaust gas purification device 1 will be described below. The controller 10 operates the exhaust gas purification device 1. Normal operation or regeneration operation is performed in each of the branch exhaust passages 2 and 3 by the controller 10.

During the normal operation, the exhaust gas discharged from the exhaust passage 100 on the engine side of the internal combustion engine or the like is passed through the branch exhaust passages 2 and 3, and the nitrogen oxides contained in the exhaust gas are adsorbed onto the nitrogen oxide adsorbing material 5. One or all of the branch exhaust passages 2 and 3 are subjected to the normal operation. The controller 10 switches the shutoff valve 4 so that the branch exhaust passage subjected to the regeneration operation communicates with the exhaust passage 100 on the engine side. In this embodiment in which the number of the branch exhaust passages is two, the following three cases are available: a first case in which the exhaust passage 100 on the engine side communicates with the branch exhaust passage 2, a second case in which the exhaust passage 100 on the engine side communicates with the branch exhaust passage 3, and a third case in which the exhaust passage 100 on the engine side communicates with the branch exhaust passages 2 and 3. The controller 10 does not operate the first combustion device 6 inside the branch exhaust passage subjected to the normal operation.

During the regeneration operation, after the nitrogen oxides adsorbed onto the nitrogen oxide adsorbing material 5 inside each of the branch exhaust passages 2 and 3 by virtue of the normal operation are detached from the nitrogen oxide adsorbing material 5, the nitrogen oxides are reduced to nitrogen and rendered harmless. One of the branch exhaust passages 2 and 3 and the junction exhaust passage 110 are subjected to the regeneration operation. Since the normal operation is performed in at least one of the branch exhaust passages when the exhaust gas purification device 1 is being operated, not all the branch exhaust passages are subjected to the regeneration operation simultaneously. The controller 10 switches the shutoff valve 4 so that the communication between the branch exhaust passage subjected to the regeneration operation and the exhaust passage 100 on the engine side is shut off. The controller 10 operates the first combustion device 6 inside the branch exhaust passage subjected to the regeneration operation.

When the operation of the internal combustion engine or the like connected to the exhaust gas purification device 1 is started, the controller 10 starts the operation of the exhaust gas purification device 1 accordingly. As the exhaust gas purification device 1 operates, the controller 10 performs the normal operation or the regeneration operation in each of the branch exhaust passages 2 and 3.

During the normal operation, the nitrogen oxides contained in the exhaust gas are adsorbed onto the nitrogen oxide adsorbing material 5. The nitrogen oxides are thus eliminated from the exhaust gas. Furthermore, since the nitrogen oxide adsorbing material 5 has oxidation catalyst components, the carbon monoxide and hydrocarbons contained in the exhaust gas are oxidized. Therefore, the carbon monoxide and hydrocarbons are oxidized into carbon dioxide and water and rendered harmless. The carbon dioxide and hydrocarbons are thus eliminated from the exhaust gas.

The exhaust gas from which the nitrogen oxides are eliminated is fed to the junction exhaust passage 110.

As the nitrogen oxide adsorbing material 5 adsorbs the nitrogen oxides, the adsorption capability of the nitrogen oxide adsorbing material 5 lowers. Detaching the nitrogen oxides from the nitrogen oxide adsorbing material 5 is necessary to maintain the adsorption capability of the nitrogen oxide adsorbing material 5. For this reason, after the normal operation is performed for a constant time in the branch exhaust passage, the normal operation is stopped and the regeneration operation is performed, and then the normal operation is restarted.

Furthermore, since the nitrogen oxide adsorbing material 5 contains catalyst components having an oxidation action, even if the unburned matters (carbon monoxide and hydrocarbons) are contained in the exhaust gas, the unburned matters are oxidized and rendered harmless.

During the regeneration operation, the controller 10 operates the first combustion device 6 in the excess fuel condition. By the operation of the first combustion device 6, the first mixture gas is burned in the first combustion zone A1, the first burned gas is generated, and the first burned gas is fed to the nitrogen oxide adsorbing material 5. The first burned gas provides a reducing atmosphere.

Since the nitrogen oxide adsorbing material 5 is placed in the reducing atmosphere at this time, the nitrogen oxides adsorbed onto the nitrogen oxide adsorbing material 5 are detached from the nitrogen oxide adsorbing material 5.

Furthermore, since the nitrogen oxide adsorbing material 5 contains noble metals, such as Pt, the nitrogen oxides detached from the nitrogen oxide adsorbing material 5 are reduced to nitrogen or ammonia immediately. When the temperature of the nitrogen oxide adsorbing material 5 is lower than the predetermined temperature Tp, a relatively large amount of ammonia is produced.

The temperature of the nitrogen oxide adsorbing material 5 is generally determined by the temperature of the exhaust gas. This is based on the following reasons. First, since the implementation time (regeneration operation time WR) of the regeneration operation is shorter than the implementation time (normal operation time WN) of the normal operation, the temperature of the nitrogen oxide adsorbing material 5 significantly depends on the temperature of the exhaust gas. Second, since the first burned gas having been warmed passes through the branch exhaust passage subjected to the regeneration operation although the exhaust gas does not pass therethrough, the nitrogen oxide adsorbing material 5 is not cooled to room temperature even during the regeneration operation. For these reasons, the temperature of the nitrogen oxide adsorbing material 5 is generally maintained at the temperature of the exhaust gas of the internal combustion engine or the like during the regeneration operation.

The product (nitrogen or ammonia) produced by the reduction action is fed to the junction exhaust passage 110 while being mixed with the first burned gas.

Figure 2:
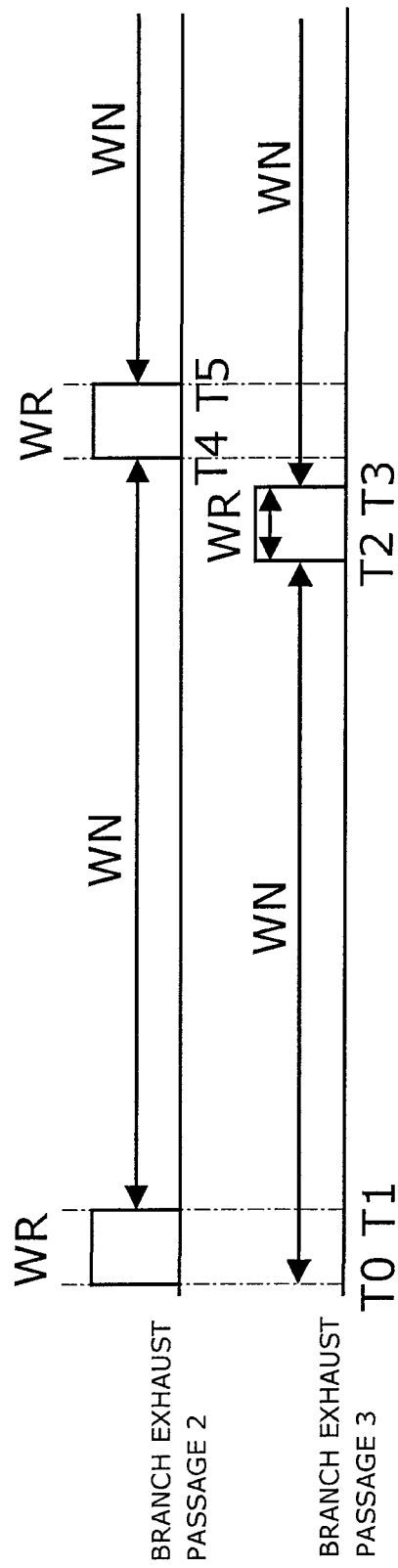
FIG. 2 is a time table for normal operation and regeneration operation in branch exhaust passages.

FIG. 2 is a time table for the normal operation and the regeneration operation in the respective branch exhaust passages 2 and 3. In each of the branch exhaust passages 2 and 3, the normal operation and the regeneration operation are performed periodically and repeatedly. The continuous implementation time of the normal operation is defined as the normal operation time WN, and the continuous implementation time of the regeneration operation is defined as the regeneration operation time WR. The normal operation in the branch exhaust passage 2 is partly overlapped with the normal operation in the branch exhaust passage 3 along the time axis. On the other hand, the branch exhaust passages 2 and 3 are not subjected to the regeneration operation simultaneously.

The controller 10 starts the regeneration operation in the branch exhaust passage 2 and starts the normal operation in the branch exhaust passage 3 at operation start time T0 (the time when the operation of the exhaust gas purification device 1 is started). In other words, the controller 10 controls the shutoff valve 4 to shut off the communication between the exhaust passage 100 on the engine side and the branch exhaust passage 2 and to establish the communication between the exhaust passage 100 on the engine side and the branch exhaust passage 3. For this reason, the exhaust gas flows into the branch exhaust passage 3. In addition, the controller 10 operates the first combustion device 6 inside the branch exhaust passage 2 subjected to the regeneration operation.

In the branch exhaust passage 2, the regeneration operation is performed in a period from the operation start time T0 to time T1, the normal operation is performed in a period from time T1 to time T4, and the regeneration operation is performed in a period from time T4 to time T5. The period from time T0 to time T1 and the period from time T4 to time T5 each correspond to the regeneration operation time WR. In addition, the period from time T1 to time T4 corresponds to the normal operation time WN.

In the branch exhaust passage 3, the normal operation is performed in a period from the operation start time T0 to time T2, the regeneration operation is performed in a period from time T2 to time T3, and the normal operation is performed in a period from time T3 to time T6. The period from time T3 to time T6 corresponds to the normal operation time WN. The period from time T2 to time T3 corresponds to the regeneration operation time WR. The period of the first normal operation performed after the operation start time T0 is shorter than the normal operation time WN during which the normal operation is performed usually. This is because the regeneration operation in the branch exhaust passage 2 cannot be performed immediately after the end of the regeneration operation in the branch exhaust passage 3 since the time for the switching between the normal operation and the regeneration operation is required in each of the branch exhaust passages 2 and 3.

In the case that the normal operation is performed in both the branch exhaust passages 2 and 3 as in the period from time T1 to time T2, the exhaust gas from which the nitrogen oxides are eliminated flows from each of the branch exhaust passages 2 and 3 to the junction exhaust passage 110. Then, the exhaust gas from the branch exhaust passage 2 joins the exhaust gas from the branch exhaust passage 3, and the joined gas is discharged into the atmosphere.

In the case that the normal operation is performed in one of the branch exhaust passages 2 and 3 and the regeneration operation is performed in the other of the branch exhaust passages 2 and 3 as in the period from time T2 to time T3 and the period from time T4 to time T5, the exhaust gas and the first burned gas containing nitrogen or ammonia flows into the junction exhaust passage 110. At this time, when the normal operation and the regeneration operation are performed simultaneously in the different branch exhaust passages 2 and 3, the nitrogen oxides remain intentionally in the exhaust gas inside the branch exhaust passage in which the normal operation is performed.

The exhaust gas purification device 1 is controlled so that the exhaust gas in which the nitrogen oxides remain and the gas (the first burned gas) containing ammonia serving as a reducing agent reducing the nitrogen oxides flow into the junction exhaust passage 110 simultaneously. Then, the ammonia generated during the regeneration operation is chemically reacted with the nitrogen oxides discharged during the normal operation, whereby both the nitrogen oxides and the ammonia are rendered harmless. This will be described below in detail.

During the regeneration operation, when the nitrogen oxide adsorbing material 5 is in the above-mentioned high temperature atmosphere, the most of the nitrogen oxides detached from the nitrogen oxide adsorbing material 5 are reduced to nitrogen. Furthermore, when the nitrogen oxide adsorbing material 5 is in the above-mentioned low temperature atmosphere, a relatively large amount of the nitrogen oxides detached from the nitrogen oxide adsorbing material 5 is reduced to ammonia.

The adsorption performance of the nitrogen oxide adsorbing material 5 depends on temperature conditions. When the nitrogen oxide adsorbing material 5 is in the above-mentioned high temperature atmosphere, the adsorption performance of the nitrogen oxide adsorbing material 5 is maintained high. On the other hand, when the nitrogen oxide adsorbing material 5 is in the above-mentioned low temperature atmosphere, the adsorption performance of the nitrogen oxide adsorbing material 5 becomes low.

In the case that the nitrogen oxide adsorbing material 5 is in the high temperature atmosphere, an action is carried out so that the amount of the ammonia generated is small during the regeneration operation and so that insufficient adsorption of the nitrogen oxides does not occur during the normal operation. In order that this action is carried out, the period of the normal operation time WN and the adsorption performance and the reduction performance (the performance of reducing nitrogen oxides to ammonia or nitrogen) of the nitrogen oxide adsorbing material 5 are set. As the adsorption amount of the nitrogen oxides increases, the adsorption performance of the nitrogen oxide adsorbing material 5 lowers. However, by finishing the normal operation and shifting the normal operation to the regeneration operation before the adsorption performance becomes lower than a constant threshold value, the occurrence of the insufficient adsorption can be suppressed. In other words, the shorter the period of the normal operation time WN is set, the higher the adsorption performance becomes. As a result, the exhaust gas from which the nitrogen oxides are eliminated and the first burned gas not containing ammonia are fed to the junction exhaust passage 110. These gases rendered harmless are then discharged into the atmosphere.

On the other hand, in the case that the nitrogen oxide adsorbing material 5 is in the low temperature atmosphere, an action is carried out so that ammonia is generated during the regeneration operation and so that insufficient adsorption of the nitrogen oxides occurs during the normal operation. In order that this action is carried out, the period of the normal operation time WN and the adsorption performance and the reduction performance (the performance of reducing nitrogen oxides to ammonia or nitrogen) of the nitrogen oxide adsorbing material 5 are set. Therefore, the exhaust gas in which the nitrogen oxides remain and the first burned gas containing ammonia are fed to the junction exhaust passage 110.

The exhaust gas in which the nitrogen oxides remain joins the first burned gas containing ammonia at the exhaust inlet 110a of the junction exhaust passage 110. The gas obtained after the joining (hereafter referred to as joined gas) passes through the selective reduction catalyst 19. By virtue of the selective reduction catalyst 19, the nitrogen oxides in the joined gas are reduced and the ammonia in the joined gas is oxidized, whereby nitrogen and water are produced. As a result, both the nitrogen oxides and the ammonia are rendered harmless, and the joined gas rendered harmless is discharged into the atmosphere.

(Implementation Time of Regeneration Operation)

As shown in FIG. 2, for the purpose of effectively carrying out the reaction between the nitrogen oxides and the ammonia, the implementation period of the regeneration operation in one of the branch exhaust passages is synchronized with the final stage of the normal operation in the other branch exhaust passage. Since the adsorption amount of the nitrogen oxides adsorbed onto the nitrogen oxide adsorbing material 5 increases as the implementation time of the normal operation becomes longer, the remaining amount of the nitrogen oxides in the exhaust gas becomes largest at the final stage of the normal operation time WN. Therefore, for the purpose of preventing the nitrogen oxides from being discharged into the atmosphere, it is preferable that the end time (time T4) of the normal operation time WN in one of the branch exhaust passages, i.e., the branch exhaust passage 2, is synchronized with the end time (time T3) of the regeneration operation time WR in the other branch exhaust passage 3. However, in consideration of the time required for switching between the normal operation and the regeneration operation, a slight difference is provided between the end time of the normal operation time WN and the end time of the regeneration operation time WR.

(Adjustment of a Temperature Range in which the Adsorption Performance of the Nitrogen Oxide Adsorbing Material is High and a Temperature Range in which the Purification Performance of the Selective Reduction Catalyst is High)

Furthermore, for the purpose of effectively carrying out the reaction between the nitrogen oxides and the ammonia, a temperature range in which the adsorption performance of the nitrogen oxide adsorbing material is high and a temperature range in which the purification performance of the selective reduction catalyst is high are adjusted as described below.

Figure 3:
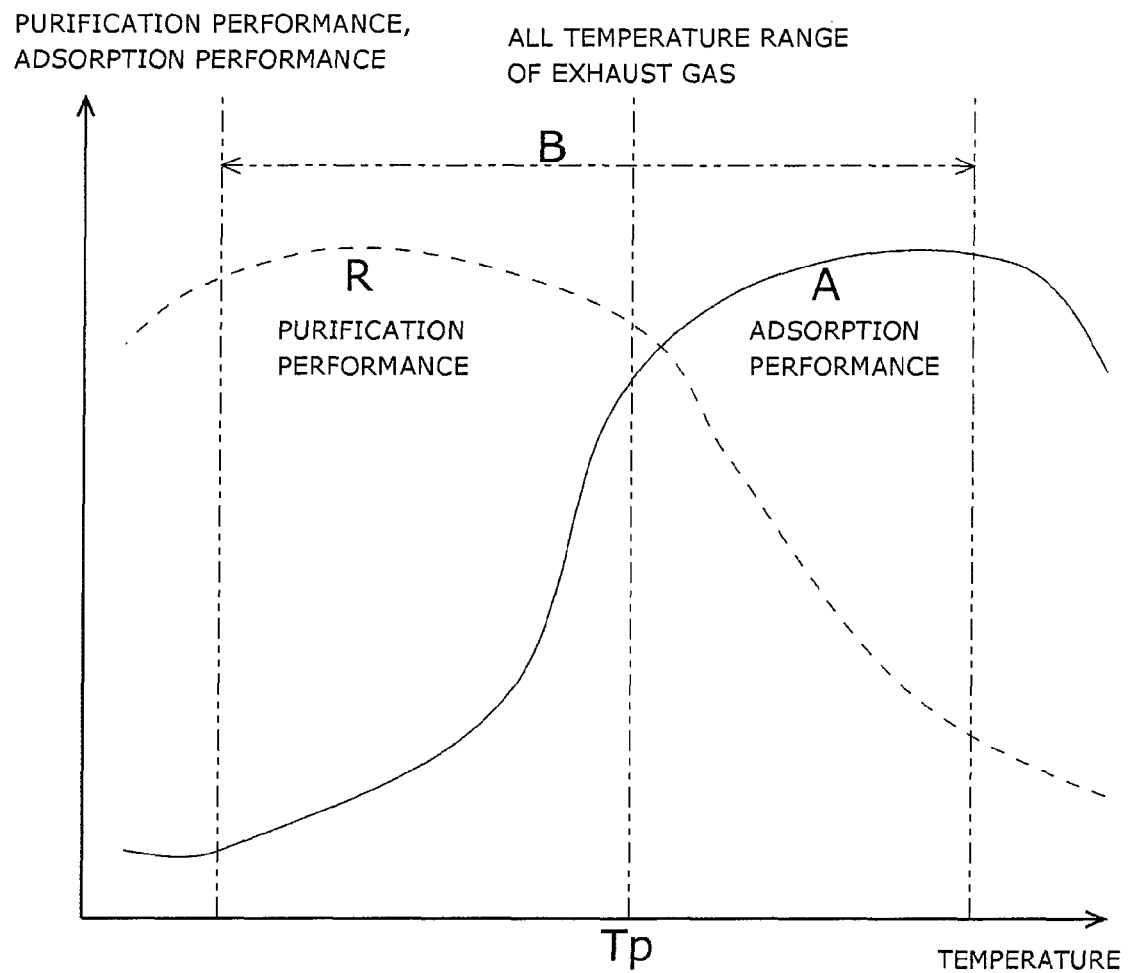
FIG. 3 is a graph showing a graph representing how the adsorption performance of a nitrogen oxide adsorbing material changes with temperature and also showing a graph representing how the activity of a selective reduction catalyst changes with temperature.

FIG. 3 is a graph showing a graph A (solid line) representing how the adsorption performance of the nitrogen oxide adsorbing material 5 changes with temperature, showing a graph R (broken line) representing how the activity of the selective reduction catalyst 19 changes with temperature, and also showing the all temperature range B of the exhaust gas. The all temperature range B is defined as a range in which the temperature of the exhaust gas can vary when the exhaust gas discharged from the internal combustion engine or the like reaches the branch exhaust passages 2 and 3.

The adsorption performance (the activity in the adsorption) of the nitrogen oxide adsorbing material 5 is adjusted so that the adsorption performance in a high temperature range within the all temperature range B becomes higher, where the high temperature range is composed of temperatures which are higher than or equal to a predetermined temperature TP. In addition, the purification performance (the activity in the reduction action) of the selective reduction catalyst 19 is adjusted so that the purification performance in low temperature range within the all temperature range B becomes higher, where the low temperature range is composed of temperatures which are lower than or equal to a predetermined temperature TP. As described above, the predetermined temperature Tp is a temperature serving as a rough basis for determining whether a relatively large amount of ammonia, i.e., an intermediate product, is produced or a relatively large amount of nitrogen, i.e., a final product, is produced when the nitrogen oxide adsorbing material reduces nitrogen.

The following can be found through the graph A and the graph R. When the temperature of the exhaust gas is in the low temperature range at the final stage of the normal operation during which the regeneration operation is performed, the adsorption performance of the nitrogen oxide adsorbing material 5 is relatively lower than that when the temperature of the exhaust gas is in the high temperature range. For this reason, the nitrogen oxides are relatively hard to be adsorbed onto the nitrogen oxide adsorbing material 5, and the concentration of the nitrogen oxides contained in the exhaust gas is raised. Furthermore, when the temperature of the exhaust gas is in the low temperature range, the nitrogen oxides are reduced to ammonia by the nitrogen oxide adsorbing material 5. On the other hand, when the temperature of the exhaust gas is in the low temperature range, the purification performance of the selective reduction catalyst 19 is relatively higher than that when the temperature of the exhaust gas is in the high temperature range. Therefore, the amount of the nitrogen oxides reduced by ammonia becomes relatively larger. In other words, the reduction action reducing the nitrogen oxides in the selective reduction catalyst 19 occurs vigorously to cope with a situation when the amount of the nitrogen oxides contained in the exhaust gas is large.

When the temperature of the exhaust gas is in the high temperature range at the final stage of the normal operation during which the regeneration operation is performed, the adsorption performance of the nitrogen oxide adsorbing material 5 is relatively higher than that when the temperature of the exhaust gas is in the high temperature range. For this reason, the nitrogen oxides are relatively easy to be adsorbed onto the nitrogen oxide adsorbing material 5, and the exhaust gas contains almost no nitrogen oxides. Furthermore, when the temperature of the exhaust gas is in the high temperature range, the most of the nitrogen oxides are reduced to nitrogen by the nitrogen oxide adsorbing material 5. On the other hand, when the temperature of the exhaust gas is in the high temperature range, the purification performance of the selective reduction catalyst 19 is relatively lower than that when the temperature of the exhaust gas is in the low temperature range. Therefore, the amount of the nitrogen oxides reduced by ammonia becomes relatively smaller. In other words, the amount of the nitrogen oxides contained in the exhaust gas is smaller to cope with a situation when the reduction action reducing the nitrogen oxides in the selective reduction catalyst 19 is hard to occur.

As a result, the nitrogen oxides are discharged in a harmless state from the exhaust gas purification device 1 regardless of whether the temperature of the exhaust gas is in the high temperature range or in the low temperature range.

(Effects of First Embodiment)

The exhaust gas purification device 1 according to the first embodiment has the following effects.

The exhaust gas purification device 1 has the above-mentioned configuration. For this reason, when the exhaust inlet 2a (or 3a) of at least one of the branch exhaust passages, i.e., 2 (or 3), is opened and the exhaust outlet 3a (or 2a) of at least one of the branch exhaust passages, i.e., 3 (or 2), is closed and when the reducing atmosphere generator (the first combustion device 6) is operated, the nitrogen oxides contained in the exhaust gas having passed through the branch exhaust passage 2 (or 3) being opened are reduced by the selective reduction catalyst 19 disposed in the junction exhaust passage 110 by using the ammonia produced in the branch exhaust passage 3 (or 2) being closed as a reducing agent.

Therefore, the nitrogen oxides not adsorbed onto the nitrogen oxide adsorbing material 5 can be rendered harmless, and the amount of the nitrogen oxides discharged into the atmosphere can be prevented from increasing.

The reducing atmosphere generator is formed of the first combustion device 6. Therefore, the reducing atmosphere generator can provide a rising temperature atmosphere in addition to the reducing atmosphere. Furthermore, reducing atmospheres and rising temperature atmospheres in various conditions can be generated by adjusting the flow rate of the air and the flow rate of the fuel. In particular, the reducing atmosphere generator can provide reducing agents, such as carbon monoxide and hydrocarbons, by virtue of partial oxidation a reaction in an excess fuel condition, whereby the nitrogen oxides are detached and reduced effectively.

The nitrogen oxide adsorbing material contains at least one of Pt, Pd and Rh as a component thereof. Therefore, the nitrogen oxides are reduced to ammonia effectively by the catalytic action of the nitrogen oxide adsorbing material 5.

The adsorption performance of the nitrogen oxide adsorbing material 5 and the purification performance of the selective reduction catalyst 19 are adjusted in the temperature ranges described above. Therefore, the nitrogen oxides are discharged in a harmless state from the exhaust gas purification device 1 regardless of whether the temperature of the exhaust gas is in the high temperature range or in the low temperature range.

The implementation time of the regeneration operation is set so as to be synchronized with the final stage of the normal operation. For this reason, when the amount of the nitrogen oxides passing through the nitrogen oxide adsorbing material 5 without being adsorbed is the largest, ammonia is supplied to the selective reduction catalyst 19, whereby the amount of the nitrogen oxides discharged into the atmosphere is decreased further.

(Configuration of Second Embodiment)

Figure 4:
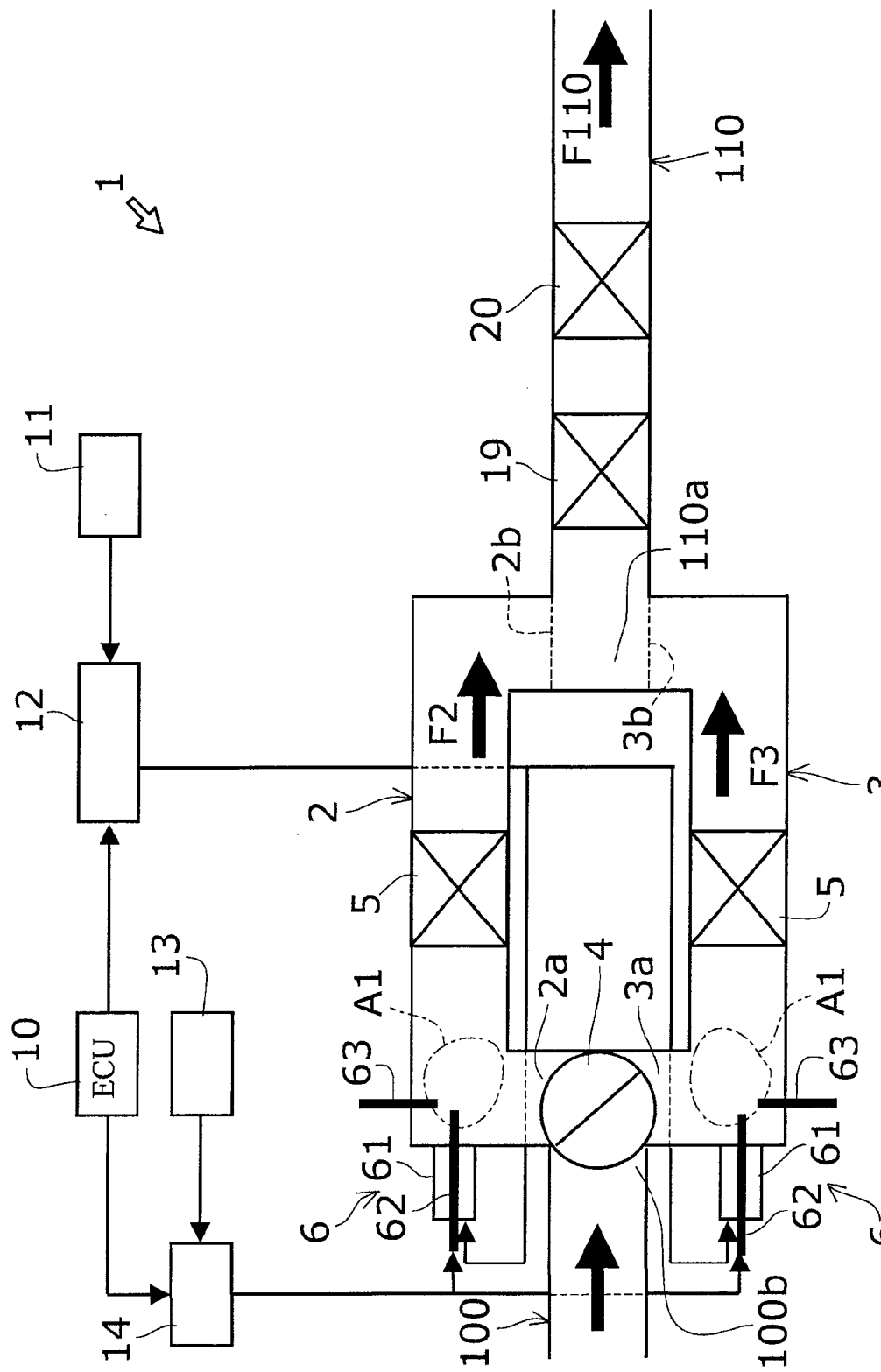
FIG. 4 is a schematic view showing an exhaust gas purification device (a second embodiment)

An exhaust gas purification device 1 according to a second embodiment will be described below referring to FIG. 4. The exhaust gas purification device 1 according to the second embodiment has a configuration in which an oxidation catalyst 20 is further provided for the exhaust gas purification device 1 according to the first embodiment.

The oxidation catalyst 20 is a material containing an oxidation catalyst and disposed on the exhaust downstream side of the selective reduction catalyst 19 inside the junction exhaust passage 110. When gas containing ammonia and unburned matters (carbon monoxide and hydrocarbons) passes through the oxidation catalyst 20, the ammonia and unburned matters in the gas are oxidized and rendered harmless.

(Effects of Second Embodiment)

The exhaust gas purification device 1 according to the second embodiment further has the following effects.

The oxidation catalyst 20 is provided on the exhaust downstream side of the selective reduction catalyst 19. Therefore, the ammonia and unburned matters (carbon monoxide and hydrocarbons) can be prevented from being discharged into the atmosphere. As a result, even if the reducing atmosphere is generated excessively, no problem occurs, whereby the regeneration (the detachment of the nitrogen oxides) of the nitrogen oxide adsorbing material 5 can be carried out effectively.

(Configuration of Third Embodiment)

Figure 5:
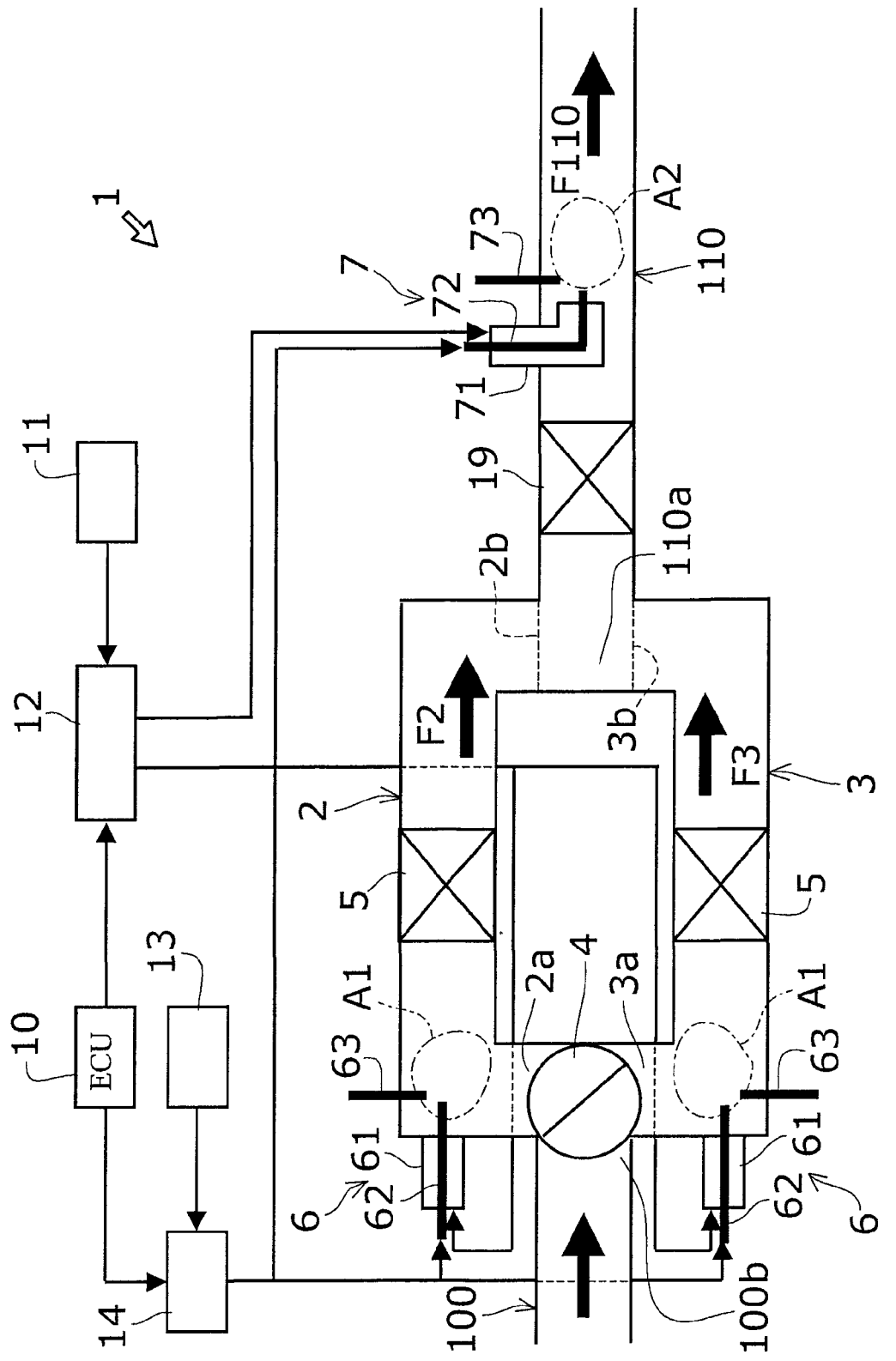
FIG. 5 is a schematic view showing an exhaust gas purification device (a third embodiment)

An exhaust gas purification device 1 according to a third embodiment will be described below referring to FIG. 5. The exhaust gas purification device 1 according to the third embodiment has a configuration in which a second combustion device 7 is further provided for the exhaust gas purification device 1 according to the first embodiment.

The second combustion device 7 is disposed on the exhaust downstream side of the selective reduction catalyst 19 inside the junction exhaust passage 110.

The second combustion device 7 includes an air supply unit, a fuel supply unit and an ignition unit. The first combustion device 7 causes a combustion reaction in an excess air condition, thereby oxidizing the ammonia and unburned matters (carbon monoxide and hydrocarbons) contained in the gas passing through the junction exhaust passage 110 and rendering them harmless.

The air supply unit of the second combustion device 7 is similar to the air supply unit of the first combustion device 6. The air supply unit of the second combustion device 7 is equipped with the air supply unit 11, the air amount adjustment unit 12 and an air nozzle 71. In other words, the air nozzle 61 in the air supply unit of the first combustion device 6 is replaced with the air nozzle 71 in the air supply unit of the second combustion device 7. The air nozzle 71 is open in a second combustion zone A2 inside the branch exhaust passages 2 and 3.

The fuel supply unit of the second combustion device 7 is also similar to the fuel supply unit of the first combustion device 6. The fuel supply unit of the second combustion device 7 is equipped with the fuel tank 13, the fuel amount adjustment unit 14 and a fuel nozzle 72. In other words, the fuel nozzle 62 in the air supply unit of the first combustion device 6 is replaced with the fuel nozzle 72 in the fuel supply unit of the second combustion device 7. The fuel nozzle 62 is open in the second combustion zone A2 inside the branch exhaust passages 2 and 3.

The ignition unit of the second combustion device 7 is also similar to the ignition unit of the first combustion device 6. The ignition unit of the second combustion device 7 is an ignition plug 73 that is used to perform ignition in the second combustion zone A2 inside the branch exhaust passages 2 and 3.

The range of the second combustion zone A2 is determined as described below. The second combustion zone A2 is defined as a zone inside the junction exhaust passage 110 in which the combustion reaction by means of the second combustion device 7 occurs. The second combustion zone A2 ranges from the second combustion device 7 to a predetermined position on the exhaust downstream side thereof. The range of the second combustion zone A2 is determined depending on the speed of the air injected from the air nozzle 71, the delay time of ignition timing with respect to the supply start timing of fuel and air, etc.

Exactly speaking, the position of the second combustion device 7 in the junction exhaust passage 110 indicates the positions of the air nozzle 71, the fuel nozzle 72 and the ignition plug 73. The air nozzle 71, the fuel nozzle 72 and the ignition plug 73 of the second combustion device 7 are components directly relating to the junction exhaust passage 110.

(Operation of Third Embodiment)

Next, the operation of the exhaust gas purification device 1 according to the third embodiment, relating to the second combustion device 7, will be described below. The operation according to the third embodiment is the same as that according to the first embodiment, except for the operation relating to the second combustion device 7.

When the regeneration operation is performed in one of the branch exhaust passages, the controller 10 operates the second combustion device 7. On the other hand, when the regeneration operation is not performed in all the branch exhaust passages, the controller 10 does not operate the second combustion device 7.

(Effects of Third Embodiment)

The exhaust gas purification device 1 according to the third embodiment further has the following effects.

The second combustion device 7 is provided on the exhaust downstream side of the selective reduction catalyst 19. Therefore, the ammonia and unburned matters (carbon monoxide and hydrocarbons) can be prevented from being discharged into the atmosphere. As a result, even if the reducing atmosphere is generated excessively, no problem occurs, whereby the regeneration (the detachment of the nitrogen oxides) of the nitrogen oxide adsorbing material can be carried out effectively. Furthermore, in comparison with the oxidation catalyst, the second combustion device 7 is advantageous in that performance degradation due to continuous use and performance reduction due to temperature dependency do not occur.

(Configuration of Fourth Embodiment)

Figure 6:
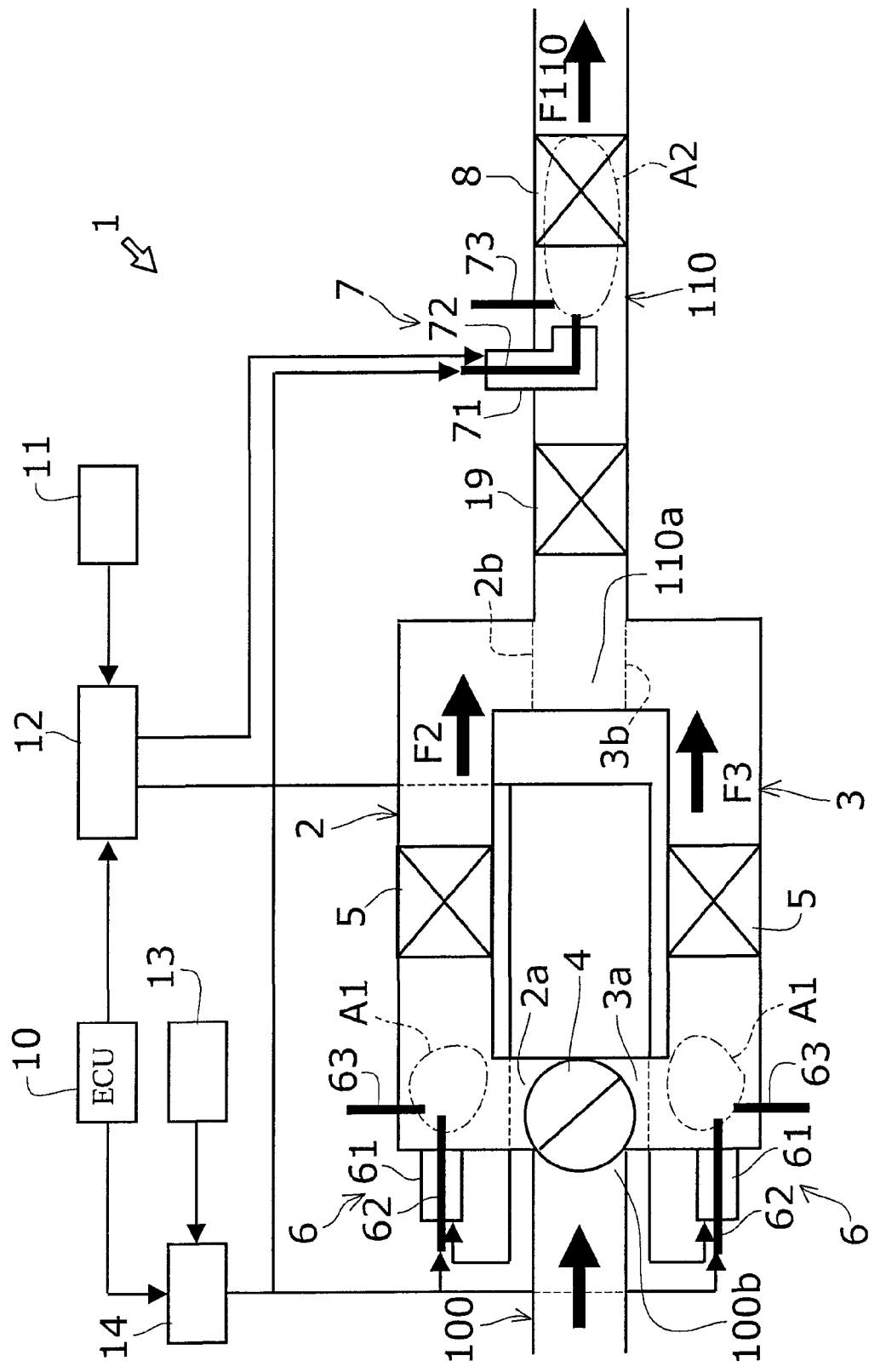
FIG. 6 is a schematic view showing an exhaust gas purification device (a fourth embodiment)
Figure 7:
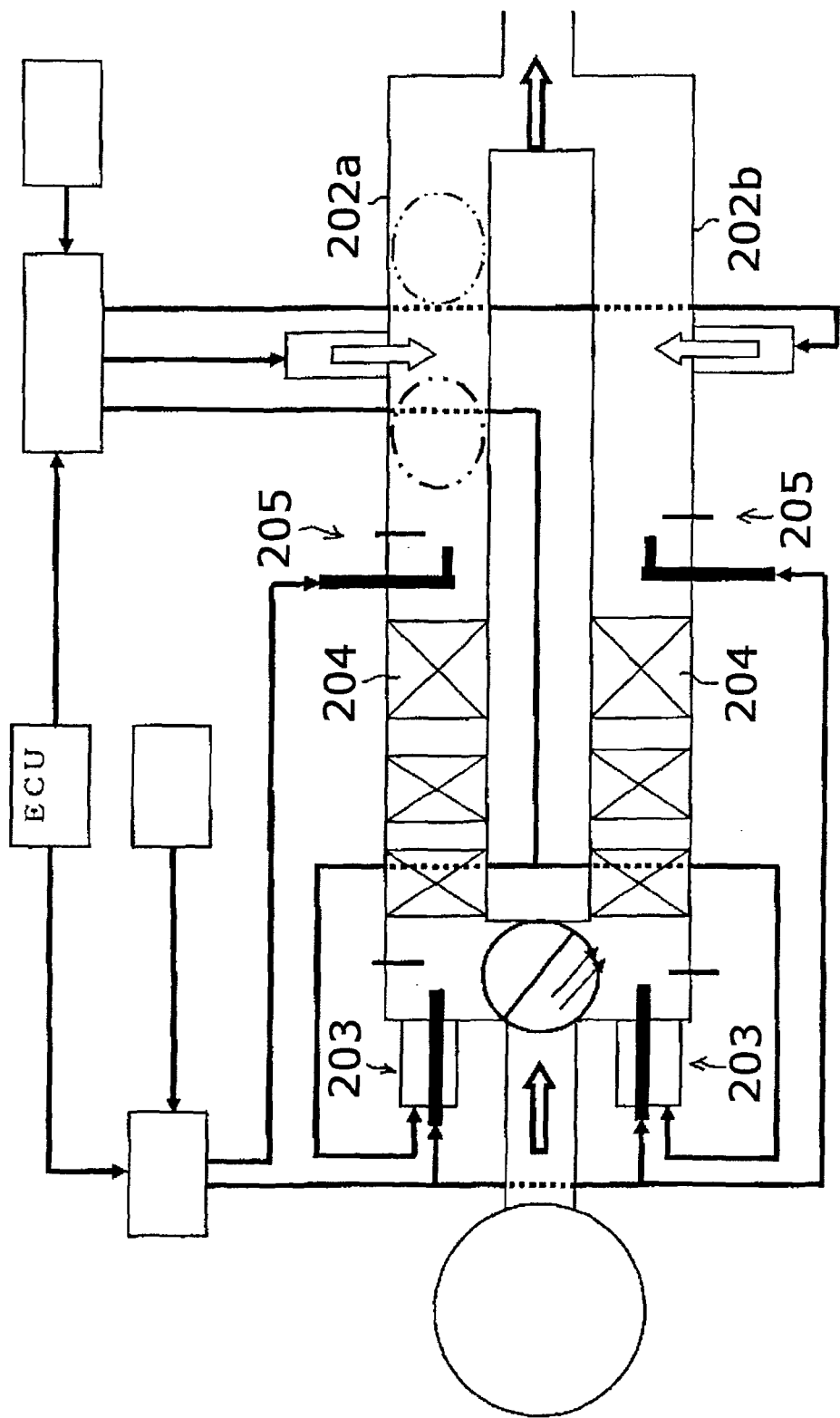
FIG. 7 is a schematic view showing the conventional exhaust gas purification device.

An exhaust gas purification device 1 according to a fourth embodiment will be described below referring to FIG. 6. The exhaust gas purification device 1 according to the fourth embodiment has a configuration in which a filter member 8 is further provided for the exhaust gas purification device 1 according to the third embodiment.

The filter member 8 is disposed on the exhaust downstream side of the second combustion device 7 inside the junction exhaust passage 110.

The filter member 8 is a member capable of trapping particulate matter contained in the exhaust gas. The particulate matter is defined as particles of carbon, hydrocarbons, etc. generated due to incomplete combustion of fuel.

(Operation of Fourth Embodiment)

Next, the operation of the exhaust gas purification device 1, relating to the filter member 8, will be described below. The operation according to the fourth embodiment is the same as that according to the third embodiment, except for the operation relating to the filter member 8.

During the regeneration operation relating to the nitrogen oxides, the controller 10 operates the second combustion device 7. The second combustion device 7 functions not only as a device oxidizing ammonia and unburned matters but also as a device regenerating the filter member 8.

When the second combustion device 7 is operated, a combustion reaction occurs in an excess air state in the second combustion zone A2. By this combustion reaction, the particulate matter trapped in the filter member 8 is oxidized and eliminated. However, it may be possible to use a configuration in which the second combustion device 7 is operated to regenerate the filter member 8, separate from the regeneration operation relating to the nitrogen oxides.

(Effects of Fourth Embodiment)

The exhaust gas purification device 1 according to the fourth embodiment has the following effects.

The exhaust gas purification device 1 is equipped with the filter member 8. Therefore, the particulate matter can be eliminated from the exhaust gas. Furthermore, the trapping capability of the filter member 8 can be maintained by the operation of the second combustion device 7.

(Modification Example of Filter Member)

The filter member 8 may contain one of the noble metals selected from among Pt, Rh and Pd. In addition, in the third embodiment, the filter member 8 containing one of the noble metals selected from among Pt, Rh and Pd may be disposed instead of the oxidation catalyst 20. In this case, the noble metal Pt, Rh or Pd functions as an oxidation catalyst.

INDUSTRIAL APPLICABILITY

The present invention is applicable to a device purifying exhaust gas discharged from internal combustion engines, such as diesel engines, gas engines, gasoline engines or gas turbine engines, or burning appliances, such as combustion furnaces and boilers.

The invention claimed is:

1. An exhaust gas purification device connected to an exhaust passage on the engine side of an internal combustion engine or a burning appliance, the exhaust gas purification device comprising:
    a plurality of branch exhaust passages connected to the exhaust passage on the engine side;
    a junction exhaust passage formed by the union of the respective branch exhaust passages on the exhaust downstream side of the respective branch exhaust passages;
    an exhaust gas shutoff unit switching between allowing and shutting off the flow of exhaust gas into the respective branch exhaust passages from the exhaust passage on the engine side by opening or closing the exhaust inlets of the respective branch exhaust passages;
    a nitrogen oxide adsorbing material, disposed inside each of the respective branch exhaust passages, temporarily adsorbing nitrogen oxides in an excess air atmosphere, and detaching the adsorbed nitrogen oxides in a reducing atmosphere;
    a reducing atmosphere generator, disposed on the exhaust upstream side of the nitrogen oxide adsorbing material inside each of the branch exhaust passages, having an air supply unit, and changing the air supplied from the air supply unit into the reducing atmosphere; and
    a selective reduction catalyst, provided inside the junction exhaust passage, and selectively reducing the nitrogen oxides by using ammonia as a reducing agent.

2. The exhaust gas purification device according to claim 1, wherein the reducing atmosphere generator is a first combustion device comprising an air supply unit, a fuel supply unit and an ignition unit.

3. The exhaust gas purification device according to claim 1, wherein the nitrogen oxide adsorbing material contains at least one of Pt, Pd and Rh as a component thereof.

4. The exhaust gas purification device according to claim 1, further comprising:
    an oxidation catalyst disposed on the exhaust downstream side of the selective reduction catalyst inside the junction exhaust passage.

5. The exhaust gas purification device according to claim 1, further comprising:
    a second combustion device on the exhaust downstream side of the selective reduction catalyst inside the junction exhaust passage,
    wherein the second combustion device comprises an air supply unit, a fuel supply unit and an ignition unit.

6. The exhaust gas purification device according to claim 5, further comprising:
    a filter member, disposed on the exhaust downstream side of the second combustion device inside the junction exhaust passage, and being capable of trapping particulate matter contained in the exhaust gas.

7. The exhaust gas purification device according to claim 1, wherein the adsorption performance of the nitrogen oxide adsorbing material is adjusted so that the adsorption performance in a high temperature range becomes higher than the adsorption performance in the other temperature range, where the high temperature range and the other temperature range are included within all temperature range of the exhaust gas and the high temperature range is composed of temperatures which are higher than or equal to a predetermined temperature,
    wherein the purification performance of the selective reduction catalyst is adjusted so that the purification performance in low temperature range becomes higher than the purification performance in the other temperature range, where the low temperature range and the other temperature range are included within the all temperature range of the exhaust gas and the low temperature range is composed of temperatures which are lower than or equal to the predetermined temperature.

8. The exhaust gas purification device according to claim 1, further comprising:
    a controller controlling the exhaust gas shutoff unit and the reducing atmosphere generators so that the implementation period of regeneration operation for operating one of the reducing atmosphere generators is synchronized with the final stage of the implementation period of normal operation in the other branch exhaust passages.

* * * * *